(12) United States Patent
Kang

(10) Patent No.: US 7,573,690 B2
(45) Date of Patent: Aug. 11, 2009

(54) BACKUP FUSE DEVICE, ELECTRONIC APPARATUS INCLUDING THE BACKUP FUSE DEVICE, AND METHOD OF OPERATING THE BACKUP FUSE DEVICE

(75) Inventor: Sung-rae Kang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 382 days.

(21) Appl. No.: 11/399,721

(22) Filed: Apr. 7, 2006

(65) Prior Publication Data

US 2006/0245120 A1 Nov. 2, 2006

(30) Foreign Application Priority Data

Apr. 13, 2005 (KR) .................. 10-2005-0030733

(51) Int. Cl.
*H02H 5/04* (2006.01)
(52) U.S. Cl. .................................... 361/104
(58) Field of Classification Search .............. 361/103, 361/104
See application file for complete search history.

(56) References Cited

U.S. PATENT DOCUMENTS 6,043,712 A * 3/2000 Leizerovich et al. ........ 330/279
6,091,273 A * 7/2000 Bernstein et al. ............ 327/321
6,653,711 B1 * 11/2003 Dhanasekaran et al. ..... 257/529
6,928,273 B2 * 8/2005 Nitta ....................... 455/127.5

FOREIGN PATENT DOCUMENTS

JP 04017513 A * 1/1992

OTHER PUBLICATIONS

Kumada, Junchi. Abstract for JP04-17513. Jan. 22, 1992.*

* cited by examiner

*Primary Examiner*—Ronald W Leja
*Assistant Examiner*—Christopher J Clark
(74) *Attorney, Agent, or Firm*—Cantor Colburn LLP

(57) ABSTRACT

A backup fuse device includes a switching unit electrically conducted to perform electrical signal transfer when it is determined that electrical signal transfer through a main fuse is failed, and a backup fuse opening to block the electrical signal transfer when the voltage of the electrical signal supplied through the electrical conduction of the switching unit exceeds a predetermined level. An electronic apparatus including the backup fuse device may also include the main fuse, a power supply unit, and a circuit. A method of operating the backup fuse device is further provided.

18 Claims, 4 Drawing Sheets

BACKUP FUSE DEVICE, ELECTRONIC APPARATUS INCLUDING THE BACKUP FUSE DEVICE, AND METHOD OF OPERATING THE BACKUP FUSE DEVICE

This application claims priority to Korean Patent Application No. 10-2005-0030733, filed on Apr. 13, 2005 and all the benefits accruing therefrom under 35 U.S.C. § 119, and the contents of which in its entirety are herein incorporated by reference.

BACKGROUND OF THE INVENTION

1. Field of the Invention

The present invention relates to a backup fuse device, an electronic apparatus including the backup fuse device, and a method of operating the backup fuse device. More particularly, the present invention relates to a backup fuse device usable within an electronic apparatus, such as a liquid crystal display ("LCD"), where the backup fuse device can contribute to enhancement of product yield for the electronic apparatus, an electronic apparatus including the backup fuse device, and a method of operating the backup fuse device.

2. Description of the Related Art

Main power input terminals of most electronic products are provided with fuses to prevent the application of an overcurrent to internal circuits.

For example, in manufacturing electronic products such as liquid crystal displays ("LCDs"), a large number of inspection tasks are performed, which extend from the inspection of printed circuit board ("PCB") assemblies to the inspection of finished products. During these inspection tasks, the inspected products may experience unexpected and transient surges. At this time, a fuse opens to block electrical signal transfer, thereby protecting internal circuits, etc. of the electronic products undergoing inspection. Examples of such surges include various types of electro-static discharge ("ESD") conditions, including an electrostatic phenomenon caused by an operator, and repetitive switching ON/OFF of a main power through an input connector.

If the opening of the fuse by a surge occurs at an early stage of PCB assembly inspection, it can be processed by a simple verification procedure. However, if the opening of the fuse occurs at a later inspection stage of a finished product, after shipment, or the like, the opened fuse may retard the process and cause consumers' dissatisfaction, etc.

BRIEF SUMMARY OF THE INVENTION

The present invention provides a backup fuse device adapted to an electronic apparatus, such as a liquid crystal display ("LCD"), where the backup fuse device can contribute to enhancement of product yield, an electronic apparatus including the backup fuse device, and a method of operating the backup fuse device.

According to exemplary embodiments of the present invention, there is provided a backup fuse device including a switching unit electrically conducted to perform electrical signal transfer when it is determined that electrical signal transfer through a main fuse is failed, and a backup fuse opening to block the electrical signal transfer when a voltage of an electrical signal supplied through the switching unit exceeds a predetermined level.

According to other exemplary embodiments of the present invention, there is provided an electronic apparatus including a power unit, a circuit unit driven by an electrical signal supplied from the power unit, a main fuse opening to block electrical signal transfer to the circuit unit when a voltage of the electrical signal supplied from the power unit exceeds a predetermined level, and a first backup fuse device activated when the electrical signal transfer to the circuit unit is blocked by an opening of the main fuse, wherein the first backup fuse device blocks the electrical signal transfer to the circuit unit when the voltage of the electrical signal supplied from the power unit exceeds a predetermined level.

In this case, the electronic apparatus may further include a second backup fuse device activated when the electrical signal transfer is blocked by the opening of the first backup fuse, wherein the second backup fuse device blocks the electrical signal transfer to the circuit unit when the voltage of the electrical signal supplied from the power unit exceeds a predetermined level.

According to still other exemplary embodiments of the present invention, there is provided a method of operating a backup fuse device, the method including determining if electrical signal transfer through a main fuse is smoothly performed, performing electrical signal transfer through electrical conduction in the backup fuse device when it is determined that the electrical signal transfer through the main fuse is not smoothly performed, and blocking the electrical signal transfer in the backup fuse device when the voltage of the electrical signal exceeds a predetermined level.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
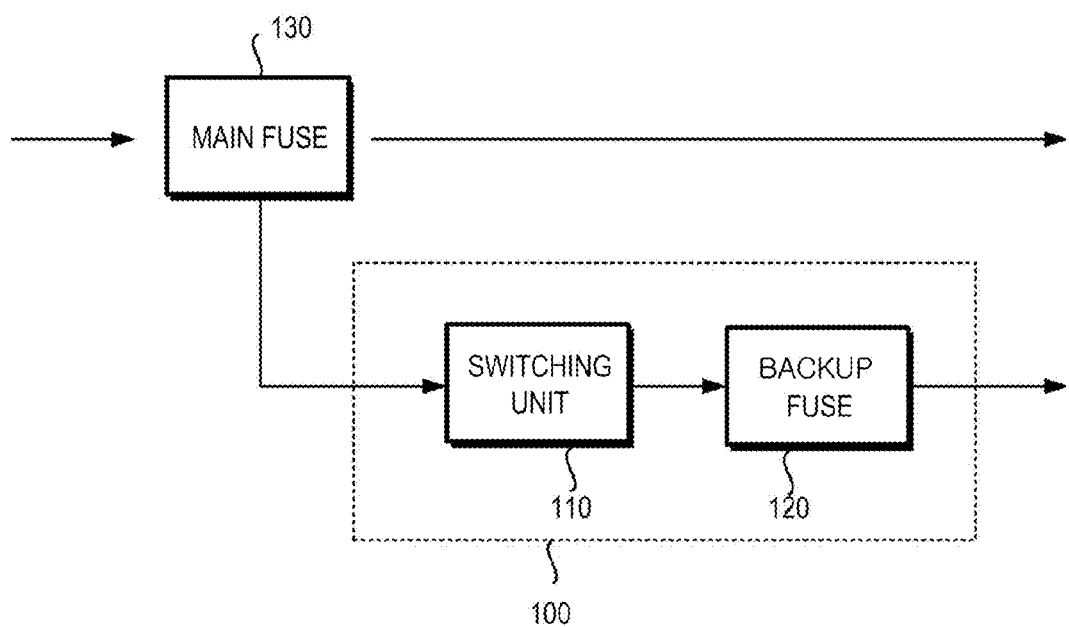
FIG. 1 is a schematic diagram of an exemplary embodiment of a backup fuse device according to the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which an exemplary embodiment of the invention is shown.

FIG. 1 is a diagram illustrating an exemplary embodiment of a backup fuse device 100 according to the present invention.

Referring to FIG. 1, an electronic product includes both a main fuse 130 and a backup fuse device 100. Under normal operation, an electrical signal transfer for driving an internal circuit of the electronic product passes from a power supply (not shown), through the main fuse 130, and to the internal circuit (not shown) in the direction of the straight arrow line from the main fuse 130. However, under certain circumstances, if it is determined that electrical signal transfer for driving the internal circuit of the electronic product is failed due to the opening of the main fuse 130, then the electrical signal from the power supply is transferred to the backup fuse device 100.

The backup fuse device 100 includes a switching unit 110 and a backup fuse 120.

The switching unit 110 is electrically conducted to perform electrical signal transfer when it is determined that electrical signal transfer for driving the internal circuit of the electronic product is failed due to the opening of the main fuse 130, or the like. Thus, even if the opening of the main fuse 130 of the electronic product occurs by sudden surge such as electrostatic discharge ("ESD"), the internal circuit can be normally driven by a stable electrical signal supply. Therefore, the electronic product may not be regarded as a damaged or defective commodity even though the main fuse 130 is opened due to the sudden surge.

When the main fuse 130 is opened, the backup fuse 120 serves as a main fuse of the electronic product after the switching unit 110 is electrically conducted. That is, the backup fuse 120 is not operated while the main fuse 130 normally functions. However, when it is determined that the function of the main fuse 130 is abnormal, and thus the switching unit 110 is electrically conducted to initiate electrical signal supply to the backup fuse 120, the backup fuse 120 permits the supplied voltage signal to be maintained below a predetermined voltage level. That is, as long as the electrical signal transfer is maintained below the predetermined voltage level through the backup fuse 120, the backup fuse 120 will serve as a main fuse for the electronic product. If the electrical signal transfer exceeds the predetermined voltage level, then the backup fuse 120 will open and prevent the excessive voltage from being delivered to the internal circuit.

Figure 2:
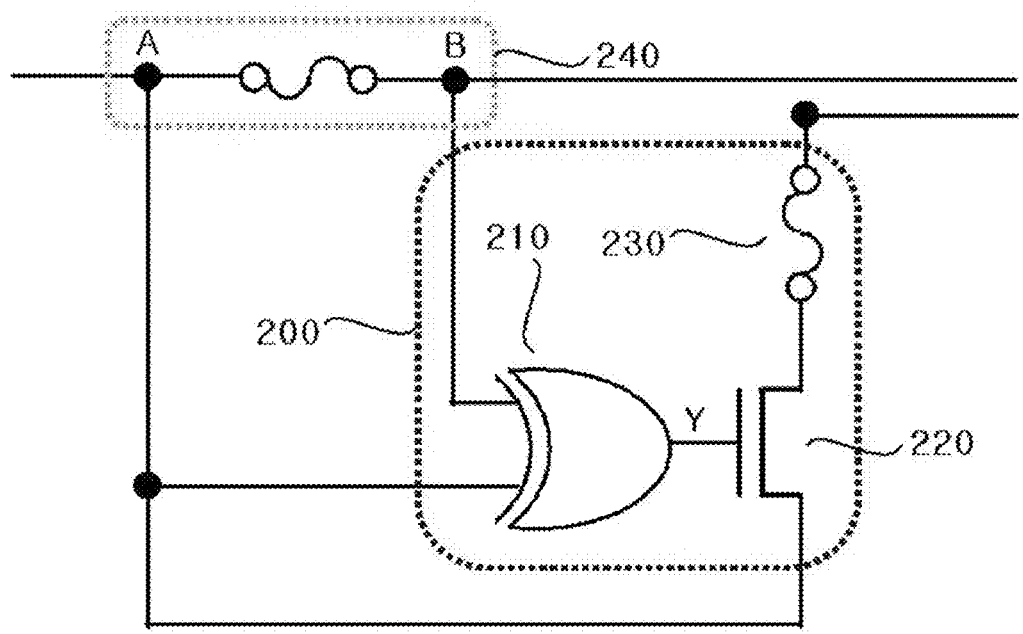
FIG. 2 is a circuit diagram showing an exemplary implementation of the exemplary backup fuse device shown in FIG. 1.

FIG. 2 is a circuit diagram showing an exemplary implementation of the exemplary backup fuse device shown in FIG. 1

Referring to FIG. 2, an electronic product includes both a main fuse 240 and a backup fuse device 200. Under normal operation, an electrical signal transfer for driving an internal circuit of the electronic product passes from a power supply (not shown), through the main fuse 240, and to the internal circuit (not shown) in the direction of the straight arrow line from the main fuse 240. That is, when a voltage of the electrical signal is below a predetermined value, then the electrical signal will transfer from the input terminal A of the main fuse 240 to the output terminal B of the main fuse 240 before being passed to the internal circuit of the electronic product. However, under certain circumstances, if it is determined that electrical signal transfer for driving the internal circuit of the electronic product is failed due to the opening of the main fuse 240, then the electrical signal from the power supply is transferred to the backup fuse device 200.

The backup fuse device 200 includes an XOR gate 210, a metal oxide semiconductor ("MOS") transistor 220, and a backup fuse 230.

The XOR gate 210, otherwise known as an exclusive-OR gate, acts as a logical "either/or". The output of the XOR gate 210 is "true" if either, but not both, of the inputs are "true", and the output of the XOR gate 210 is "false" if both inputs are "false" or if both inputs are "true". In other words, the output of the XOR gate 210 is "1" if the inputs are different, but the output of the XOR gate 210 is "0" if the inputs to the XOR gate 210 are the same. The XOR gate 210 receives signals of the input terminal A and the output terminal B of the main fuse 240 as inputs and then produces an output signal Y corresponding to the inputs. The truth table of the XOR gate 210 is presented in Table 1 below.

TABLE 1

| A | B | Y | Description |
|---|---|---|---|
| 0 | 0 | 0 | No electrical signal supply |
| 0 | 1 | 1 | No cases |
| 1 | 0 | 1 | Opening of fuse → backup fuse is operated |
| 1 | 1 | 0 | Normal operation of main fuse |

As shown in Table 1, if there is no electrical signal applied to the input terminal A of the main fuse 240 (A=0), and thus no electrical signal applied to the output terminal B (B=0), then the output signal Y is likewise false (0), and will therefore not activate the MOS transistor 220. Likewise, if an electrical signal applied to the input terminal A of the main fuse 240 is present (A=1), and an electrical signal applied to the output terminal B is also present (B=1), then it is determined that the main fuse 240 is functioning under normal operation, and the output signal Y is false (0), therefore not activating the MOS transistor 220. There are no cases where an electrical signal is applied to the output terminal B (B=1), but not to the input terminal A (A=0), and therefore the output signal Y, which would be true (Y=1), does not occur.

However, when an electrical signal applied to the input terminal A of the main fuse 240 is present (A=1) but an electrical signal applied to the output terminal B is absent (B=0), it is determined that the main fuse 240 is abnormally operated due to the opening of the main fuse 240, etc., and thus, the XOR gate 210 produces the output signal Y (Y=1).

When the output signal Y of the XOR gate 210 is input into the MOS transistor 220, the MOS transistor 220 is activated and electrically conducted to allow an electrical signal from a power supply unit (not shown) to pass there through. The output signal Y may be passed to the gate of the MOS transistor 220. By effectively "closing" the gate of the MOS transistor 220, the source and the drain of the MOS transistor 220 are connected to each other. When the source and the drain of the MOS transistor 220 are connected, then the electrical signal from the power supply unit may be transferred from the input terminal A, through the MOS transistor 220, and to the backup fuse 230.

At this time, the MOS transistor 220 can be appropriately used as an n-MOS transistor or a p-MOS transistor according to the characteristics of the internal circuit of an electronic apparatus to be embodied. The "n" and "p" indicate different types of elements (called dopants) that are added to the MOS transistor 220 when the MOS transistor 220 is fabricated. The addition of these different dopants makes n-type and p-type MOS transistors behave differently. The n-MOS transistor, or "negative channel" MOS transistor is negatively charged so that the transistor functions by the movement of electrons. The p-MOS transistor, or "positive channel" transistor, works by moving electron vacancies (holes).

When an electrical signal passed through the MOS transistor 220 is below a predetermined voltage level, then the electrical signal will pass through the input and output terminals of the backup fuse 230 and the electrical signal will be transferred to the internal circuit of the electronic product. However, when an electrical signal passed through the MOS transistor 220 exceeds a predetermined voltage level, the backup fuse 230 opens to block electrical signal transfer to thereby protect internal circuits from an overvoltage. The backup fuse 230 may be the same as the main fuse 240 in terms of material, rated capacity, etc.

The above-described constitutional elements of the backup fuse device 200 have been illustrated by way of example. Thus, those skilled in the art will recognize that a wide variety of modifications can be made with respect to the above described constitutional elements of the backup fuse device 200 as long as they perform substantially the same functions as the backup fuse device 200.

Figure 3:
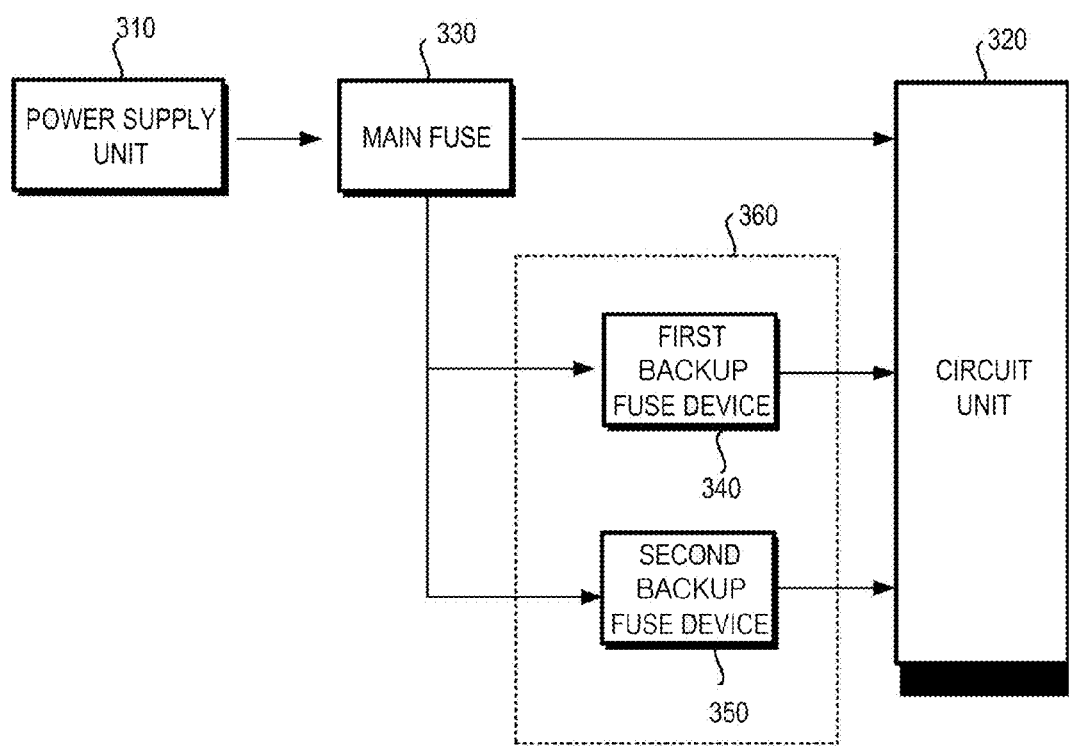
FIG. 3 is a schematic diagram of an exemplary embodiment of an electronic apparatus including the exemplary backup fuse device shown in FIG. 1.

FIG. 3 is a schematic diagram of an exemplary embodiment of an electronic apparatus including the exemplary backup fuse device shown in FIG. 1.

Referring to FIG. 3, the electronic apparatus including the backup fuse device shown in FIG. 1 may include a power supply unit 310, a circuit unit 320, a main fuse 330, and a backup fuse device 360.

The power supply unit 310 supplies an electrical signal to the circuit unit 320 to drive the circuit unit 320.

If the electrical signal from the power supply unit 310 does not exceed the predetermined voltage level, then the circuit unit 320 receives the electrical signal supplied from the power supply unit 310 and performs a predetermined operation. The circuit unit 320 can perform a variety of operations according to the function, type, etc. of an electronic apparatus including the circuit unit 320.

When the electrical signal supplied from the power supply unit 310 exceeds a predetermined voltage level, the main fuse 330 opens to protect the circuit unit 320 from an overvoltage. The electrical signal received at the input terminal of the main fuse 330 is not passed to the output terminal of the main fuse 330. That is, when an overvoltage is applied to the input terminal of the main fuse 330, the main fuse 330 opens so that supplying of an electrical signal to the internal circuit unit 320 is blocked. A user of the electronic apparatus may continue to normally use the electronic apparatus after performing a simple operation, for example, by replacing the main fuse 330.

If a normal electrical signal is applied after the main fuse 330 opens due to an overvoltage, the backup fuse device 360 serves as a spare fuse permitting an electronic apparatus to continue normal operation without replacement of the main fuse 330. That is, even when the main fuse 330 opens by a sudden surge such as ESD, etc., the electronic apparatus may not be determined to be damaged or defective. Therefore, in an electronic apparatus manufactured by a complicated processing operation, e.g., an LCD, through a large number of processing steps, a processing duration can be efficiently reduced and a production yield can be enhanced, as an electronic apparatus that experiences a sudden surge during production may still function normally and need not be repaired or replaced.

In the illustrated embodiment of FIG. 3, the backup fuse device 360 includes a first backup fuse element 340 that is activated by the opening of the main fuse 330 and a second backup fuse element 350 that is activated by the opening of the first backup fuse element 340. The number of backup fuse elements included within the backup fuse device 360 can be determined by the size and costs of an electronic apparatus, process efficiency, etc., and thus is not limited by the figures or specification of the present invention. For example, there may be x number of backup fuse elements within the backup fuse device 360, where an nth backup fuse element is activated by the opening of the (n−1)th backup fuse element. Thus, in such an embodiment, the transfer of the electrical signal to the circuit unit 320 is not prevented unless all of the backup fuses within the x number of backup fuse elements have been opened, where the last backup fuse to be opened would be the x-th backup fuse in the x-th backup fuse element.

The backup fuse device 360 may be provided at any position of an electronic apparatus where the main fuse 330 is disposed. Alternatively, the backup fuse device 360 may be provided only at a selected position, e.g., at a main input terminal or an input terminal of a main circuit module.

The internal construction, operation, and function of the backup fuse device 360 may be substantially the same as described above with reference to FIGS. 1 and 2. In other words, each backup fuse element 340, 350, etc. may include a switching unit 110 and a backup fuse 120 as shown in FIG. 1, such as, but not limited to, the XOR gate 210, the MOS transistor 220, and the backup fuse 230 as shown in FIG. 2.

Figure 4:
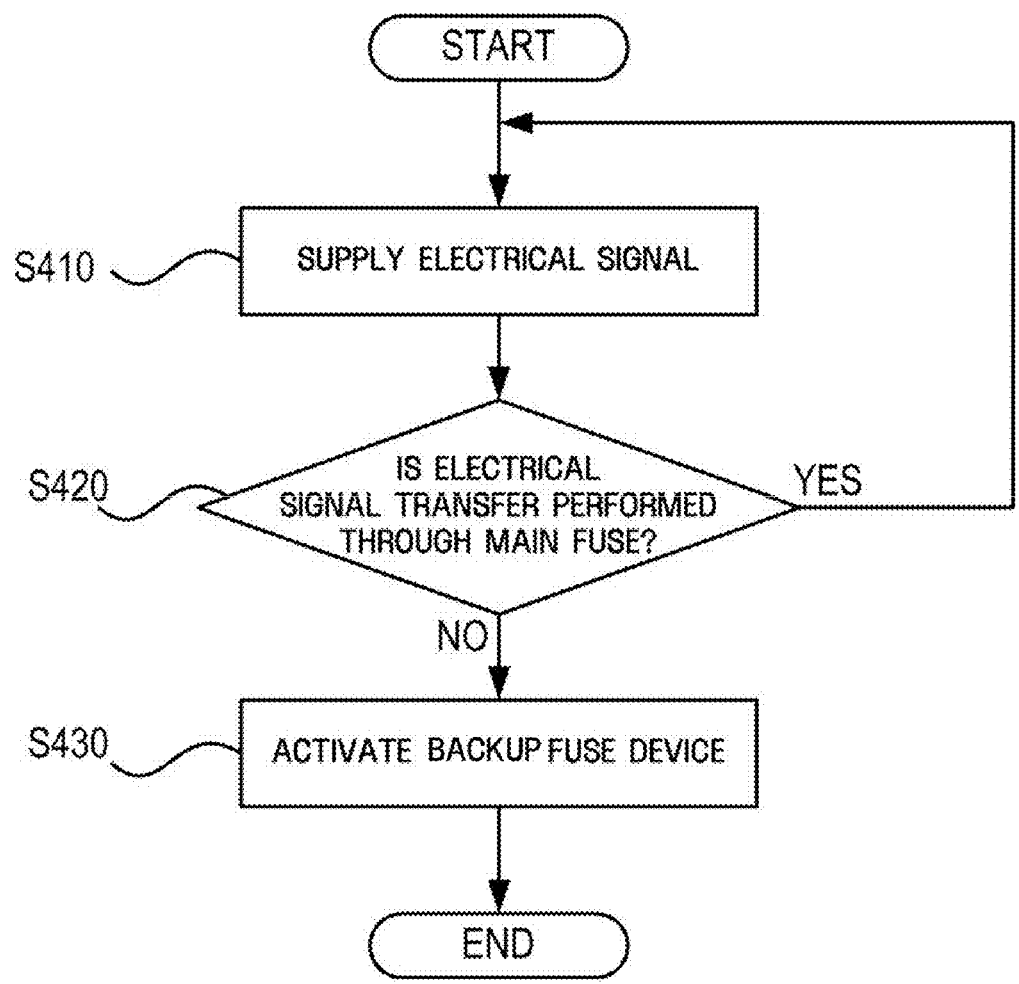
FIG. 4 is a flow diagram illustrating an exemplary embodiment of a method of operating an exemplary backup fuse device according to the present invention.

FIG. 4 is a flow diagram illustrating an exemplary embodiment of a method of operating an exemplary backup fuse device according to the present invention.

Referring to FIG. 4, when an electronic apparatus is operated according to a supplied electrical signal as shown by step S410, it is determined whether electrical signal transfer through a main fuse is smoothly performed, as shown by S420. This determination may occur, for example, within XOR gate 210 described with respect to FIG. 2.

As a result of the determination from step S420, when it is determined that the electrical signal transfer through the main fuse is smoothly performed, e.g. from the input terminal to the output terminal of the main fuse, then the method loops back to before the step S410 of supplying an electrical signal. On the other hand, when it is determined in step S420 that the electrical signal transfer through the main fuse is not smoothly performed, e.g., the main fuse is determined to be open, then the backup fuse device is activated to be electrically conducted as shown in step S430. Therefore, even when the main fuse opens, the backup fuse device can serve as a substitute for the main fuse and thus an electronic apparatus can continue to normally operate without being determined to be damaged or defective.

As described with respect to FIG. 3, the backup fuse device may include a plurality of backup fuse elements, each including its own backup fuse, and therefore if the backup fuse device is activated in step S430, then a determination may be made, similar to step S420, whether an electrical signal transfer is performed through the backup fuse prior to activating a second backup fuse device, if necessary, and so on.

Like the main fuse, the backup fuse device blocks electrical signal transfer when a voltage signal exceeds a predetermined voltage level, thereby protecting an internal circuit from an overvoltage.

Alternatively, a plurality of backup fuse devices may be provided. Of course, in this case, a subordinate backup fuse device of a backup fuse device serving as a main fuse will perform the above-described function and operation. The plurality of backup fuse devices may be successively connected, wherein each backup fuse element includes a backup fuse, a first backup fuse element is activated when electrical signal transfer is blocked by an opening of a main fuse, and subsequent backup fuse elements are each activated when electrical signal transfer is blocked by an opening of a backup fuse in a prior backup fuse element.

A backup fuse contained in a backup fuse device may have the same structure as a main fuse. As described above, the number, position, etc. of backup fuse devices can be determined in consideration of the size and costs of an electronic apparatus including the backup fuse device, processing efficiency, and so on.

As apparent from the above description, a backup fuse device of the present invention can contribute to reduction in process duration and enhancement in product yield when it is adapted to an electronic apparatus such as an LCD.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backup fuse device comprising:
    a switching unit electrically conducted to perform electrical signal transfer when it is determined that electrical signal transfer through a main fuse is failed;
    a backup fuse opening to block the electrical signal transfer when a voltage of an electrical signal supplied through the switching unit exceeds a predetermined level,
    wherein the switching unit includes a two-input logic gate, first and second inputs of the logic gate are connected to input and output terminals, respectively, of the main fuse wherein the gate is an XOR gate.

2. The backup fuse device of claim 1, wherein the logic gate determines when electrical signal transfer through a main fuse is failed.

3. The backup fuse device of claim 1, wherein the switching unit includes a transistor connected to an output of the logic gate.

4. The backup fuse device of claim 3, wherein the transistor is an MOS transistor.

5. The backup fuse device of claim 3, wherein a gate of the transistor is closed, and a source and drain of the transistor are connected when electrical signal transfer through a main fuse is failed.

6. The backup fuse device of claim 1, further comprising a plurality of successively connected backup fuse elements, wherein each backup fuse element includes a backup fuse, a first backup fuse element is activated when electrical signal transfer is blocked by an opening of the main fuse, and subsequent backup fuse elements are each activated when electrical signal transfer is blocked by an opening of a backup fuse in a prior backup fuse element.

7. An electronic apparatus comprising:
    a power unit;
    a circuit unit driven by an electrical signal supplied from the power unit;
    a main fuse opening to block electrical signal transfer to the circuit unit when a voltage of the electrical signal supplied from the power unit exceeds a predetermined level;
    a switching unit electrically conducted to perform electrical signal transfer when it is determined that the electrical signal transfer through the main fuse is failed; and
    a first backup fuse device activated when the electrical signal transfer to the circuit unit is blocked by an opening of the main fuse, wherein the first backup fuse device blocks the electrical signal transfer to the circuit unit when the voltage of the electrical signal supplied from the power unit exceeds a predetermined level,
    wherein the switching unit includes a two-input logic gate, first and second inputs of the logic gate are connected to input and output terminals, respectively, of the main fuse wherein the logic gate is an XOR gate.

8. The electronic apparatus of claim 7, further comprising a second backup fuse device activated when the electrical signal transfer is blocked by the opening of the first backup fuse, wherein the second backup fuse device blocks the electrical signal transfer to the circuit unit when the voltage of the electrical signal supplied from the power unit exceeds a predetermined level.

9. The electronic apparatus of claim 7, wherein the first backup fuse device comprises:
    a first backup fuse opening to block the electrical signal transfer when the voltage of the electrical signal supplied through the electrical conduction of the switching unit exceeds a predetermined level.

10. The electronic apparatus of claim 7, wherein the switching unit includes a transistor connected to an output of the logic gate.

11. The electronic apparatus of claim 10, wherein the transistor is an MOS transistor.

12. The backup fuse device of claim 10, wherein a gate of the transistor is closed, and a source and drain of the transistor are connected when electrical signal transfer through the main fuse is failed.

13. The electronic apparatus of claim 9, further comprising a second backup fuse device activated when the electrical signal transfer is blocked by the opening of the first backup fuse, wherein the second backup fuse device blocks the electrical signal transfer to the circuit unit when the voltage of the electrical signal supplied from the power unit exceeds a predetermined level.

14. The electronic apparatus of claim 7, wherein the logic gate determines when electrical signal transfer through the main fuse is failed.

15. The electronic apparatus of claim 7, wherein the logic gate receives a first signal from the input terminal of the main fuse, and a second signal from the output terminal of the main fuse.

16. A method of operating a backup fuse device, the method comprising:
    determining if electrical signal transfer through a main fuse is abnormally operated;
    performing electrical signal transfer through electrical conduction in the backup fuse device when it is determined that the electrical signal transfer through the main fuse is abnormally operated; and
    blocking the electrical signal transfer in the backup fuse device when the voltage of the electrical signal exceeds a predetermined voltage level,
    wherein determining if electrical signal transfer through a main fuse is abnormally operated includes sending a first signal from an input terminal of the main fuse and a second signal from an output terminal of the main fuse to a two-input logic gate in the backup fuse device wherein the two-input logic gate is an XOR gate.

17. The method of claim 16, wherein blocking the electrical signal transfer in the backup fuse device includes opening the backup fuse.

18. The method of claim 16, wherein performing electrical signal transfer through electrical conduction in the backup fuse device includes closing a gate of a transistor connected to an output of the logic gate and connecting a source and drain of the transistor.

* * * * *

UNITED STATES PATENT AND TRADEMARK OFFICE
CERTIFICATE OF CORRECTION

PATENT NO.       : 7,573,690 B2                              Page 1 of 1
APPLICATION NO.  : 11/399721
DATED            : August 11, 2009
INVENTOR(S)      : Sung-rae Kang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Fourteenth Day of December, 2010

David J. Kappos
*Director of the United States Patent and Trademark Office*